United States Patent [19]

Nissborg

[11] Patent Number: 5,010,244

[45] Date of Patent: Apr. 23, 1991

[54] METHOD TO DETECT RADIATION AND MEASURE ITS ANGLE OF INCIDENCE AND A DETECTOR ARRANGEMENT TO CARRY OUT THE METHOD

[75] Inventor: Kurt Nissborg, Skänninge, Sweden

[73] Assignee: Forsvarets Forskningsanstalt, Stockholm, Sweden

[21] Appl. No.: 392,529

[22] PCT Filed: Nov. 25, 1988

[86] PCT No.: PCT/SE88/00646

§ 371 Date: Jul. 20, 1989

§ 102(e) Date: Jul. 20, 1989

[87] PCT Pub. No.: WO89/04972

PCT Pub. Date: Jun. 1, 1989

[30] Foreign Application Priority Data

Nov. 27, 1987 [SE] Sweden .............................. 8704739

[51] Int. Cl.$^5$ .............................................. H01J 40/14
[52] U.S. Cl. ................................. 250/206.1; 356/141
[58] Field of Search ............... 250/206.2, 206.1, 203.3, 250/203.4, 203.6; 356/141, 152

[56] References Cited

U.S. PATENT DOCUMENTS

| | | |
|---|---|---|
| 3,229,102 | 1/1966 | Spencer et al. |
| 3,448,273 | 6/1969 | Webb . |
| 3,992,099 | 11/1976 | Laughlin .................... 250/206.1 |
| 4,611,914 | 9/1986 | Homma ....................... 250/203.4 |
| 4,769,531 | 9/1988 | Malek .......................... 250/206.2 |
| 4,868,378 | 9/1989 | Biverot ........................ 356/141 |

FOREIGN PATENT DOCUMENTS 2830308  1/1980  Fed. Rep. of Germany .
61-31980  2/1986  Japan .
WO87/03696  6/1987  World Int. Prop. O. .

Primary Examiner—David C. Nelms
Attorney, Agent, or Firm—Fleit, Jacobson, Cohn, Price, Holman & Stern

[57] ABSTRACT

The present invention relates to a method to measure the angle of incidence for radiation and a detector to carry out the method. The background for the invention is that in certain electromagnetic radiation, for example laser light of different wavelengths from UV to IR, there occurs an irregularity, speckledness, that is among other things caused by turbulence in the atmosphere. This phenomenon gives rise to problems during the registration of a single or a few short pulses of radiation. The probability of detection can decrease considerably at the same time as difficulties to reliably determine the angle to the source of radiation with high resolution can arise. This problem is solved by the invention by placing at least two detectors (a,b,c,d) so far apart that they receive an irradiance that is essentially un-correlated in the case of speckled radiation and that the detectors are made of two detector elements (1,2) that are mounted so close to each other that both detector elements receive essentially the same irradiance and in such a direction that the normals of respective detector element form a known angle ($\beta$) with each other. One then calculates the angle of incidence ($\alpha$) by means of the signals ($S_1, S_2$) from the detector elements (1,2), that depend on the shape of the sensitivity beams, and said angle ($\beta$) between the detector elements.

8 Claims, 1 Drawing Sheet

METHOD TO DETECT RADIATION AND MEASURE ITS ANGLE OF INCIDENCE AND A DETECTOR ARRANGEMENT TO CARRY OUT THE METHOD

BACKGROUND OF THE INVENTION

The present invention relates to a method for detecting radiation and measure its angle of incidence and a detector arrangement to carry out the method. The background for the invention is that in certain electromagnetic radiation, for example laser light of different wavelengths from UV to IR, there occurs an irregularity, speckledness, that is among other things caused by turbulence in the atmosphere. The speckledness varies with a frequency of up to 100 Hz. Experiments that have been carried out have shown that this phenomenon, that means a great variation in the irradiance of the radiation that falls onto a detector, gives rise to problems during the registration of a single or a few short pulses of radiation. On one hand the probability of detection can decrease considerably and on the other hand difficulties to reliably determine the angle to the source of radiation with high resolution can arise.

SUMMARY OF THE INVENTION

These problems are, however, solved by the invention by giving it the design that is evident from the following claims.

BRIEF DESCRIPTION OF THE DRAWINGS

In the following the invention will be described in more detail with reference to the accompanying drawing where.

DETAILED DESCRIPTION OF THE PREFERRED EMBODIMENT

The basis for the idea of the invention is that the probability of detection by trying to detect the incident speckled radiation in a number of points at such a great distance from each other that the correlation between the irradiance received by the different detectors is very small increases, at the same time as the direction of the radiation in relation to a reference direction by means of specially designed detectors that consists of two detector elements 1,2 is determined. The detector elements have their detector planes in a certain angle to each other and are placed so close to each other that the correlation between the irradiance of the radiation towards them is high. Popularly speaking both detector elements measure towards the same speckle in the speckled radiation.

The correlation between the irradiance detected by the detector elements 1,2 depends on the mounting distance between the two detector elements. The wavelength, the illumination distance and the atmospheric condition also play a part here. As an example the irradiances are completely uncorrelated if the detector elements 1,2 are mounted at a distance of more than about 5 cm, if the wavelength is 1 μm and the illumination distance is 2000 m. (This is calculated from $$\sqrt{\lambda \cdot L},$$

$\lambda$=the wavelength and L=the illumination distance). When the distance is about 4 mm the correlation between the signals from the detector elements are about 0.9, which is a minimum value if one is to get useful results by the invention. The example is valid for a moderately turbulent atmosphere.

Already by using two detectors placed at such a distance that the irradiance towards them is essentially un-correlated, a much smaller risk is obtained for both detectors to get into a dark spot in the incident radiation and not detect it. The probability of detection increases with more detectors receiving un-correlated radiation.

Figure 1:
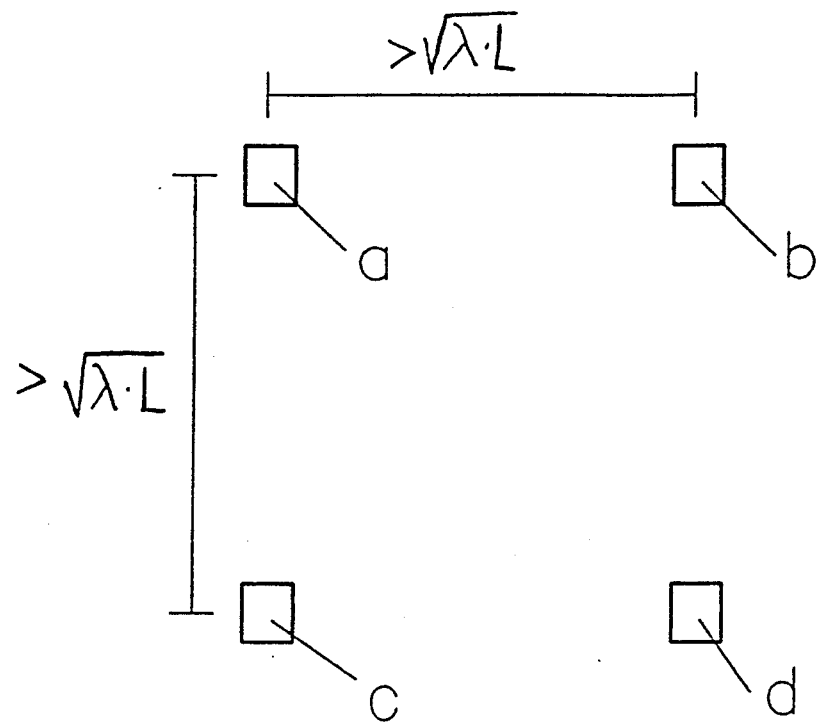
FIG. 1 shows a detector arrangement according to the invention and FIG. 2 shows a detector sensitive to the angle of incidence according to the invention.
Figure 2:
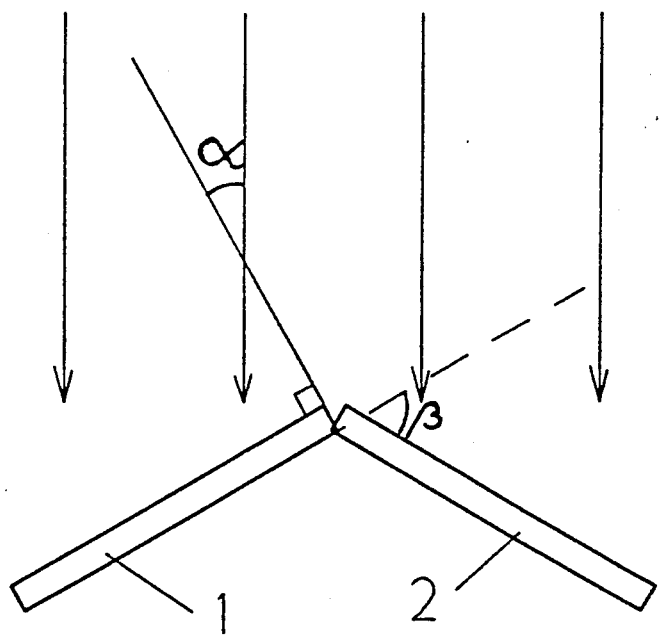

Depending on the application the detectors can be placed along a line or over an area. The mutual distance should then be about $$\sqrt{\lambda \cdot L}$$

with a limitation of L to 2000 m. In a possible application on a mast of a ship it can be suitable to place the detectors above each other, more or less in a line. In certain other cases it is conceivable, however, that another thing, for example another mast blocks all detectors in a certain direction, so that an installation over an area is preferred. A possible, simple arrangement with good effect is shown in FIG. 1 and comprises four detectors a, b, c and d placed in the corners of a square. In the case with the radiation of the wavelength 1 μm the side of the square can according to the above be about 5 cm for the signals to be un-correlated.

As stated above the two detector elements 1,2 of each detector shall measure correlated signals. From the point of view of correlation it is better the closer the elements are placed. As one tries to get a small average distance between the two detector elements 1,2 it can be suitable to use rectangular or in another way oblong detector elements that are placed with the long sides against each other. Experiments have been carried out at 1 μm with detector elements having the measures 0.6×2.5 mm, which for reasons of manufacturing technique were placed with the long sides about 1.4 mm apart.

The detector elements can be of a completely conventional type, chosen according to the wave length and pulse length of the radiation to be detected. The signal caused by the radiation from each detector element depends on the angle of incidence of the radiation. Each detector has a sensitivity beam, within which the sensitivity for incident radiation varies in a way specific for each detector type. With knowledge of the shape of the sensitivity beams for the detector elements used, the direction of the incident radiation can be referred to a desired reference direction by an angle $\alpha$ by means of a suitable signal processing. If, for example, one uses a conventional detector of the type that has a sensitivity beam having essentially a cosinusoidal dependence of the angle of incidence, the signal $S_1$, $S_2$ from each detector element arising from the radiation will depend upon the angle of incidence for the radiation according to the cosine law.

The cosine law gives:

$$S_1 = E \cos \alpha$$

$$S_2 = E \cos(\beta - \alpha)$$

where
- $S_1$ = The signal from detector element 1,
- $S_2$ = The signal from detector element 2,
- E = the power density (W/m$^2$) of the incident radiation
- $\alpha$ = the angle sought for = the angle with the normal of the detector plane 1,
- $\beta$ = the known angle between the detector planes.

If one solves with respect to $\alpha$ one gets $$\alpha = \arctan \frac{S_2/S_1 - \cos \beta}{\sin \beta}.$$

Thus it is easy to calculate the angle of incidence for the radiation in relation to a given reference direction.

I claim:

1. A method for detecting short pulses of speckled radiation caused by a turbulent atmosphere, and to measure its angle of incidence in relation to a reference direction comprising the steps of:
    placing at least two detectors so they receive an irradiance that is essentially uncorrelated in the case of speckled radiation wherein the detectors are comprised of two detector elements, mounted so both detector elements receive essentially the same irradiance and in a direction that the normals of respective detector elements form a known angle with each other; and
    calculating the angle of incidence using signals from the detector elements that depend on the shape of the sensitivity beams, and said angle between the detector elements.

2. A method according to claim 1 wherein four detectors are placed, in a square.

3. A method according to claim 1 further comprising a step of mounting the detector elements, so the correlation between the respective measured irradiance of the detector elements is greater than 0.9.

4. A method according to claim 1 further comprising the steps of choosing rectangular detector elements; and
    mounting the long sides of the detector elements against each other to give a small average distance between them.

5. A detector arrangement for detecting short pulses of speckled radiation caused by a turbulent atmosphere and measuring its angle of incidence in relation to a reference direction comprising at least two detectors placed to receive an irradiance that is essentially un-correlated in the case of speckled radiation wherein the detectors comprise:
    a first detector element; and
    a second detector element mounted to said first detector element so said first and second detector elements receive essentially the same irradiance and are orientated having the normals of the respective detector elements form a known angle with each other for calculating the angle of incidence by means of signals from the first and second detector elements, that depend on the shape of the sensitivity beams, and said angle between the first and second detector elements.

6. A detector arrangement according to claim 5 comprising four detectors wherein said four detectors are placed to form a square configuration.

7. A detector arrangement according to claim 5 wherein the first and second detector elements are mounted so the correlation between their respective measured irradiance is greater than 0.9.

8. A detector arrangement according to claim 5, wherein the first and second detector elements are rectangular and mounted having long sides placed against each other giving a small average distance between them.

* * * * *